US006885484B2

(12) United States Patent
Kasai

(10) Patent No.: US 6,885,484 B2
(45) Date of Patent: Apr. 26, 2005

(54) OPTICAL SYSTEM AND METHOD FOR FABRICATING A HOLOGRAPHIC OPTICAL ELEMENT

(75) Inventor: Ichiro Kasai, Toyonaka (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 10/619,741

(22) Filed: Jul. 15, 2003

(65) Prior Publication Data

US 2004/0212860 A1 Oct. 28, 2004

(30) Foreign Application Priority Data

Apr. 22, 2003 (JP) ........................................ 2003-116688

(51) Int. Cl.[7] ................................................ G02B 5/32
(52) U.S. Cl. ............................. 359/16; 359/15; 359/22; 359/35
(58) Field of Search ............................... 359/15–16, 22, 359/30, 35

(56) References Cited

U.S. PATENT DOCUMENTS 6,256,123 B1 * 7/2001 Hazama ....................... 359/25

2001/0033401 A1    10/2001 Kasai et al. .................... 359/15
2003/0164996 A1 *   9/2003 Popovich et al. .............. 359/22
2004/0109208 A1 *   6/2004 Amanai et al. ................ 359/13

FOREIGN PATENT DOCUMENTS

| JP | 1-92718 A  | 4/1989 |
| JP | 6-202035 A | 7/1994 |
| JP | 7-210066 A | 8/1995 |

* cited by examiner

*Primary Examiner*—Leo Boutsikaris
(74) *Attorney, Agent, or Firm*—Sidley Austin Brown & Wood LLP

(57) ABSTRACT

A simple, compact optical system is provided that includes a transmissive optical element and a HOE but that nevertheless does not require an extra optical element for the correction of chromatic aberration. The HOE is designed to have diffractive efficiency for each of R, G, and B light beams and have different focal lengths for those light beams so as to correct the longitudinal chromatic aberration produced by a rectangular parallelepiped prism. This eliminates the need for an extra means for correcting the chromatic aberration produced by the prism. The HOE may be designed to exhibit different angles of diffraction for the R, G, and B light beams so as to correct the chromatic aberration produced perpendicularly to the optical axis by a wedge-shaped prism.

10 Claims, 11 Drawing Sheets

F I G. 17
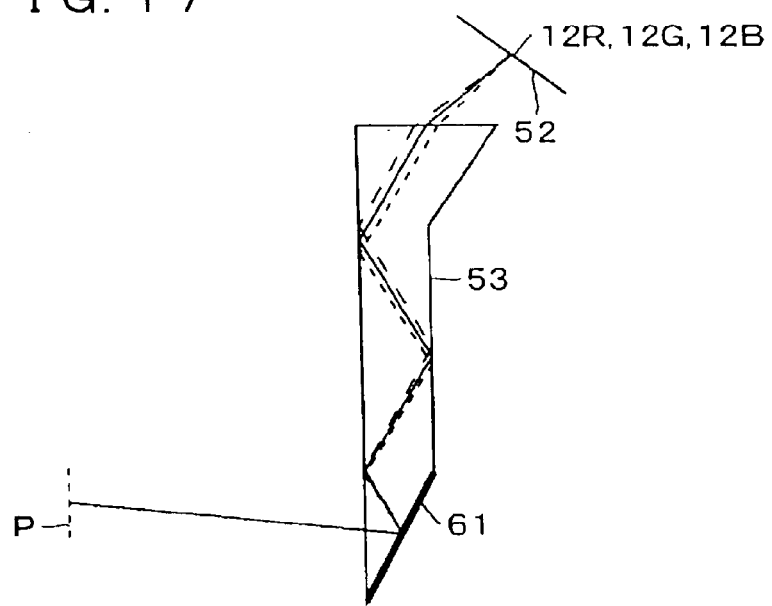
F I G. 18
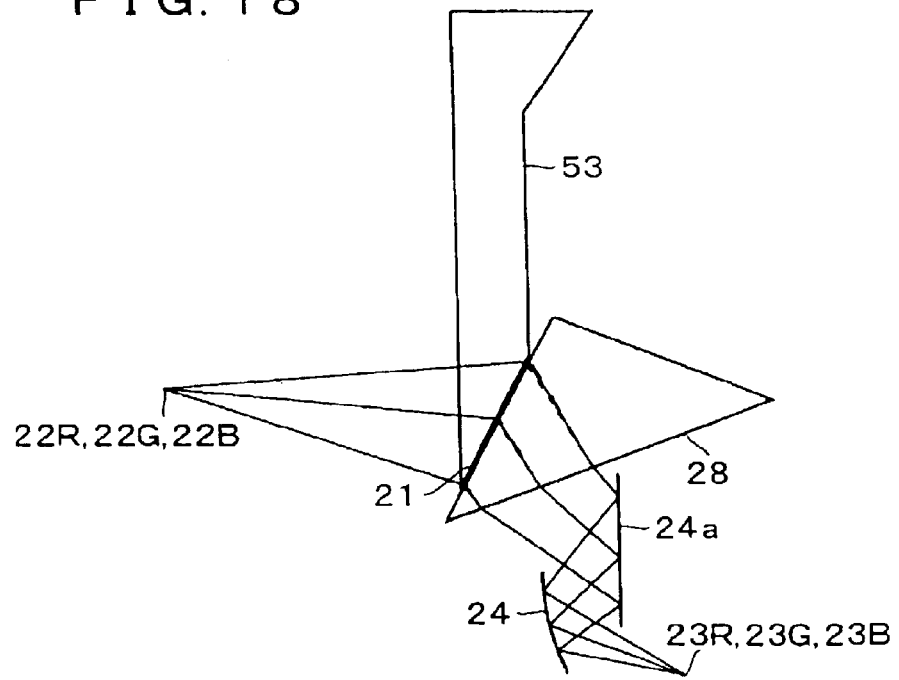

OPTICAL SYSTEM AND METHOD FOR FABRICATING A HOLOGRAPHIC OPTICAL ELEMENT

This application is based on Japanese Patent Application No. 2003-116688 filed on Apr. 22, 2003, the contents of which are hereby incorporated by reference.

BACKGROUND OF THE INVENTION

1. Field of the Invention

The present invention relates to an optical system including a transmissive optical element and a holographic optical element, and also relates to a method for fabricating a holographic optical element.

2. Description of the Prior Art

First, a brief description will be given of a hologram. A hologram is a photosensitive material on which the wavefront of light from an object is recorded. When the hologram is illuminated, the recorded wavefront of light is reproduced. This photographic technique is called holography.

To record a wavefront on a holographic material, interference of light is exploited. Light from an object is made to interfere with reference light that is given arbitrarily, and the resulting interference fringes are recorded. Accordingly, the two beams of light (object light and reference light) need to be able to interfere with each other, and therefore recording is achieved by the use of coherent light, typically laser light.

A reflective hologram exhibits far higher wavelength selectivity than a transmissive hologram, meaning that the former far more strikingly tends to respond to certain wavelengths but not to other wavelengths than the latter. FIG. 19 shows the diffraction wavelength width of a reflective and a transmissive hologram.

There are various types of holograms, among which phase-type holograms, which are of the volume type and which absorb little light, are suitable to obtain high diffraction efficiency and satisfactory incident light use efficiency.

A hologram is capable of reproducing a wavefront, and this property can be used to make it function as a lens. A hologram that is given such an optical function is called a holographic optical element (HOE).

Basically, a hologram reproduces a wavefront with the highest diffraction efficiency when it is illuminated with a light beam having the same wavelength and angle as the light beam with which it was fabricated. Accordingly, it is preferable to use as the incident light beam one having a wavelength peak that fits the diffraction efficiency peak of the hologram. FIG. 20 shows the relationship between the wavelength of the incident light beam and the obtained diffraction efficiency in a reflective hologram fabricated by the use of laser light having a wavelength of 532 nm. Suitable for use as the light source of the incident light beam with this hologram is a green light-emitting diode (LED) or the like having an emission peak around 530 nm. An LED has an emission wavelength band of which the half-width is 20 to 40 nm, and thus, by using it as the light source, it is possible to realize a construction that offers satisfactory energy efficiency. Needless to say, it is also possible to use as the light source a laser having the same emission wavelength as the one with which the hologram was fabricated.

A hologram can be configured as a color hologram that exhibits diffraction efficiency in a plurality of wavelength bands. This is achieved by recording the interference fringes of light of a plurality of wavelengths on a single holographic material by multiple exposure, or by laying a plurality of holograms, each having the interference fringes of light of a different wavelength recorded thereon, on one another. FIG. 21 shows an example of the relationship between the wavelength of the incident light beam and the obtained diffraction efficiency in a reflective color hologram.

HOEs are used in various optical systems in combination with other optical elements. In particular, color HOEs formed with color holograms can be used in the optical system of display apparatuses for displaying images. In such application, since a HOE is a diffractive element, it has a high dispersion, and this causes different types of incident light beam to behave in greatly varying manners. When the incident light beam is not light of a single wavelength but light spreading over a wavelength band, differences in wavelength cause chromatic aberration, resulting in lower resolution.

Some proposals have been made to solve this problem. For example, Japanese Patent Application Laid-Open No. H1-92718 proposes disposing within an optical system an optical element that corrects the chromatic aberration resulting from the dispersion by a HOE. Japanese Patent Application Laid-Open No. H6-202035 proposes disposing a plurality of HOEs within an optical system so that the chromatic aberration produced by one HOE is corrected by the other HOEs.

Moreover, when a color HOE is fabricated, it is irradiated with light of different wavelengths in such a way that the light of different wavelengths has as much the same wavefront as possible. This ensures that the reproduced wavefront is the same irrespective of wavelength. For example, Japanese Patent Application Laid-Open No. H7-210066 discloses using a curve-surfaced mirror in the optical system used to fabricate a HOE so that the HOE thus fabricated has an optical power but nevertheless permits light of different wavelengths to have the same wavefront. This exploits the fact that a reflective surface, as opposed to the refraction by a lens, does not exhibit wavelength dependency.

Using an extra optical element to correct the chromatic aberration produced by a HOE, as proposed in Japanese Patent Applications Laid-Open Nos. H1-92718 and H6-202035 mentioned above, is effective in producing high-resolution images. However, using an extra optical element in addition to a HOE leads to complicating and enlarging the optical system. A HOE is an optical element that has the advantages of being thin, light-weight, and simple. However, these advantages are spoilt if the use of an extra optical element is essential to correct the chromatic aberration produced by the HOE.

When an optical system includes, in addition to a HOE, another optical element, and this optical element transmits light, this transmissive optical element produces chromatic aberration. To correct this chromatic aberration, it is necessary to add an extra optical element for that purpose, or to use a high-performance optical element that simultaneously corrects the chromatic aberration produced by the HOE and by the transmissive optical element. This leads to further complicating and enlarging the optical system.

SUMMARY OF THE INVENTION

An object of the present invention is to provide a simple, compact optical system that includes a transmissive optical element and a HOE but that nevertheless does not require an extra optical element for the correction of chromatic aberration. Another object of the present invention is to provide a method for fabricating a HOE suitable for use in such an optical system.

To achieve the above object, according to one aspect of the present invention, an optical system is provided with: a holographic optical element including a plurality of holograms that have diffraction efficiency in different wavelength bands so as to be capable of reproducing different wavefronts in the different wavelength bands; and a transmissive optical element that transmits light incident thereon. Here, the aberration resulting from the fact that the light transmitted through the transmissive optical element includes light of the different wavelength bands is corrected by the holographic optical element reproducing the different wavefronts in the different wavelength bands.

In this optical system, the chromatic aberration produced by the transmissive optical element is corrected by the HOE, and therefore there is no need to use an extra optical element to correct the chromatic aberration produced by the transmissive optical element. This makes it possible to realize a simple construction that produces color images with high resolution.

Here, it is advisable that the holograms included in the holographic optical element be reflective holograms. This makes it possible to control the behavior of light of different wavelength bands independently, and thereby achieve appropriate correction of chromatic aberration that suits the transmissive optical element.

It is advisable that the holographic optical element be given a positive optical power. This makes it possible to distribute the optical power of the optical system as a whole between the transmissive optical element and the holographic optical element. This helps increase flexibility in design and make miniaturization easy.

According to another aspect of the present invention, an information display optical system is provided with a display element that displays an image formed by light of different wavelength bands; a prism that transmits the image light incident thereon from the display element; and a holographic optical element including a plurality of holograms that have diffraction efficiency in the different wavelength bands so as to be capable of reproducing different wavefronts in the different wavelength bands. The holographic optical element has an optical power equivalent to the optical power of a concave free-form reflective surface so as to function as an eyepiece lens by directing the image light from the display element to an observer's eye. Here, the aberration resulting from the fact that the light transmitted through the prism includes light of the different wavelength bands is corrected by the holographic optical element reproducing the different wavefronts in the different wavelength bands.

In this information display optical system, the optical system described above is used to present information, and the chromatic aberration produced by the prism, a transmissive optical element, is corrected by the holographic optical element. The holographic optical element also functions as an eyepiece optical system.

According to still another aspect of the present invention, a method for fabricating a holographic optical element having diffraction efficiency in a plurality of wavelength bands includes: a plurality of steps of irradiating a holographic material with two light beams so as to record interference fringes produced between the two light beams on the holographic material. The plurality of steps are performed successively or simultaneously. Here, from one step to the next, the wavelengths of the light beams with which the holographic material is irradiated are changed, and the wavefront of at least one of the light beams is also changed.

When the interference fringes between the two light beams are recorded, by making different the wavefronts of the light beams of different wavelengths, it is possible to obtain a HOE that can satisfactorily correct the chromatic aberration produced by another optical element at the time of reproduction. By contrast, with a HOE fabricated by a conventional method in such a way that the reproduced wavefront is the same irrespective of wavelength as proposed in Japanese Patent Application Laid-Open No. H7-210066 and other references, it is impossible to satisfactorily correct the chromatic aberration produced by another optical element.

Here, the wavefronts of the light beams of different wavelengths can be made different by the use of a transmissive optical element that transmits light. The angle of refraction at which light is refracted at the surface of a transmissive optical element depends on wavelength, and refraction is accompanied with dispersion of colors. This makes it possible to share a transmissive optical element, such as a lens or prism, for the light beams of different wavelengths.

The wavefronts of the light beams of different wavelengths can be made different also by the use of a diffractive optical element that diffracts light. The angle of diffraction at which light is diffracted by a diffractive optical element depends on wavelength, and diffraction is accompanied with dispersion of colors. This makes it possible to share a diffractive optical element for the light beams of different wavelengths. Moreover, diffraction causes a higher degree of dispersion of colors, and thus makes greatly different the wavefronts of the light beams of different wavelengths.

BRIEF DESCRIPTION OF THE DRAWINGS

This and other objects and features of the present invention will become clear from the following description, taken in conjunction with the preferred embodiments with reference to the accompanying drawings in which:

FIG. 17 is a diagram showing the optical system of a third embodiment of the invention;

FIG. 18 is a diagram showing an optical system used to fabricate the HOE included in the optical system of the third embodiment;

DESCRIPTION OF THE PREFERRED EMBODIMENTS

Figure 1:
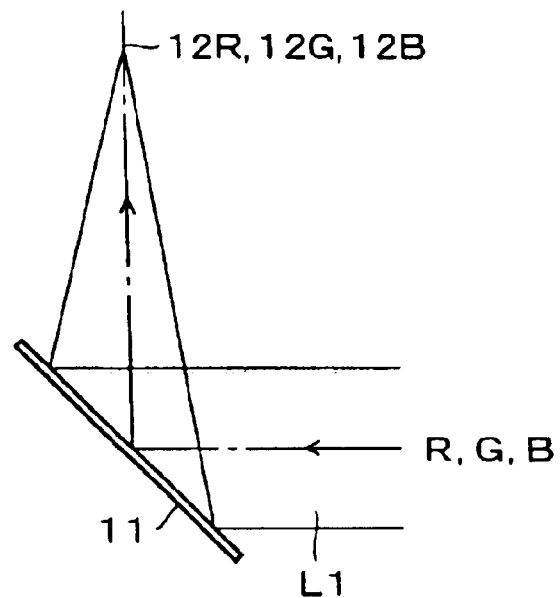
FIG. 1 is a diagram showing an optical system composed solely of a HOE.

Hereinafter, embodiments of the present invention will be described with reference to the drawings. FIG. 1 shows an optical system in which a parallel light beam L1 is imaged at a single point by a reflective HOE 11. The light beam L1 incident on this optical system is obtained by forming the light beams from three LEDs, for example emitting light of red (R), green (G), and blue (B) wavelength bands respectively, into a parallel light beam. The HOE 11 is a color HOE fabricated by laying three reflective HOEs (not shown), having diffraction peaks in the wavelength bands of the three light beams respectively, on one another.

Figure 19:
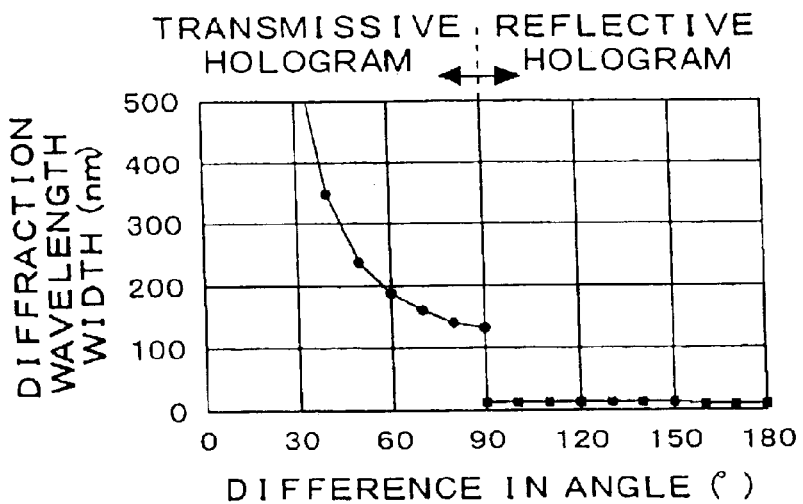
FIG. 19 is a diagram showing the diffraction wavelength width of a reflective and a transmissive hologram.
Figure 20:
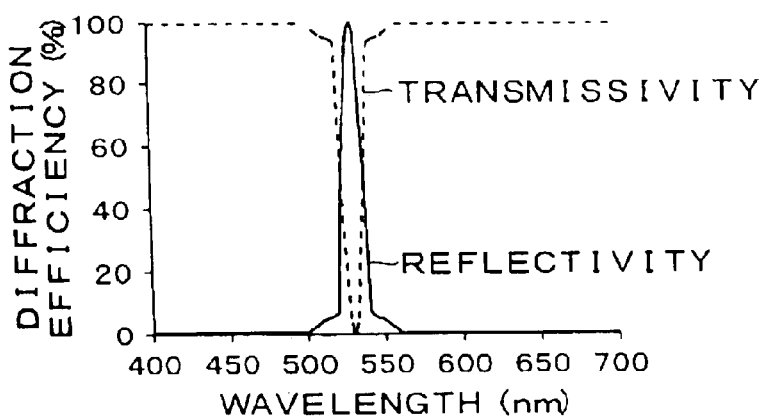
FIG. 20 is a diagram showing an example of the relationship between the wavelength of the incident light beam and the obtained diffraction efficiency in a reflective hologram.
Figure 21:
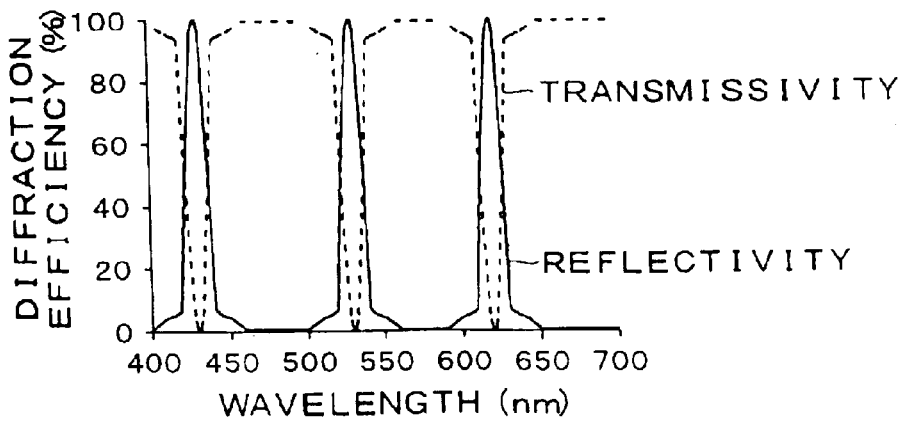
FIG. 21 is a diagram showing an example of the relationship between the wavelength of the incident light beam and the obtained diffraction efficiency in a reflective color hologram.

For each of the HOEs constituting the color HOE 11 to act only on the light beam of the corresponding wavelength band without affecting the light beams of the other wavelength bands, it is preferable that the individual HOEs be reflective HOEs having high wavelength selectivity. As shown in FIG. 19, a reflective HOE diffracts light in a far narrower wavelength width (diffraction wavelength width) than a transmissive HOE. This permits a reflective color HOE to be designed to control the behavior of light of different colors independently. In the optical system shown in FIG. 1, which includes as an optical element only the color HOE 11, to make the imaging points 12R, 12G, and 12B of the R, G, and B light beams coincident with one another, the individual HOEs corresponding to the different wavelength bands have simply to be designed to act on light of those wavelength bands in the same manner.

Figure 2:
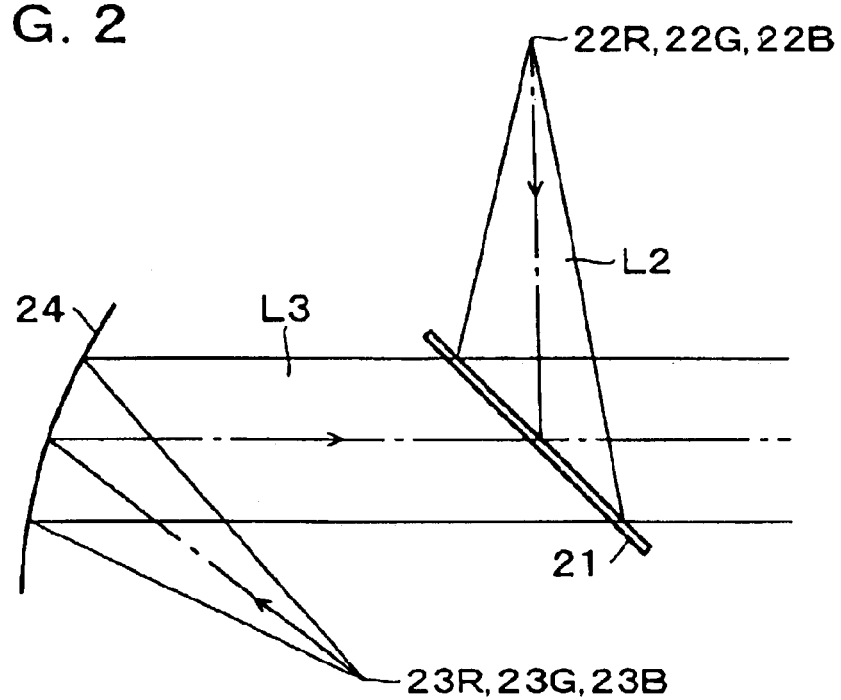
FIG. 2 is a diagram showing the optical system used to fabricate the HOE shown in FIG. 1.

An optical system like this can be fabricated by the use of a fabrication optical system as shown in FIG. 2. This fabrication optical system operates as follows. First, the light beams from three light sources, emitting R, G, and B laser light respectively, are superimposed on one another. Then, the superimposed light beams are split into two bunches of light beams. Then, each of these two bunches of light beams are made to converge so as to newly form point light sources 22R, 22G, and 22B and point light sources 23R, 23G, and 23B. Then, the laser light from the point light sources 23R, 23G, and 23B is formed into a parallel light beam L3 by the action of a concave reflective surface 24. Then, this parallel light beam is made to interfere with the divergent light beam L2 from the point light sources 22R, 22G, and 22B on a holographic material 21. The point light sources 22R, 22G, and 22B are coincident with one another, and the point light sources 23R, 23G, and 23B are coincident with one another.

The light beams from the point light sources 23R, 23G, and 23B are radiated with spherical wavefronts, but are then collimated by the concave reflective surface 24 and are thereby formed into planar waves. In this construction, the concave reflective surface 24 is inclined with respect to the point light sources 23R, 23G, and 23B, and therefore, to obtain satisfactorily planar waves, it is preferable that the concave reflective surface 24 be a nonaxisymmetric freeform surface. Since collinimation is achieved here by the use of only the reflective surface 24, which does not exhibit wavelength dependency, all the R, G, and B light beams are converted into planar waves in the same manner. The holographic material 21 having the interference fringes recorded thereon in this way is used as the color HOE 11 shown in FIG. 1 to image the R, G, and B parallel light beams L1 at points 12R, 12G, and 12B respectively, which are the same points as the point light sources 22R, 22G, and 22B.

Figure 3:
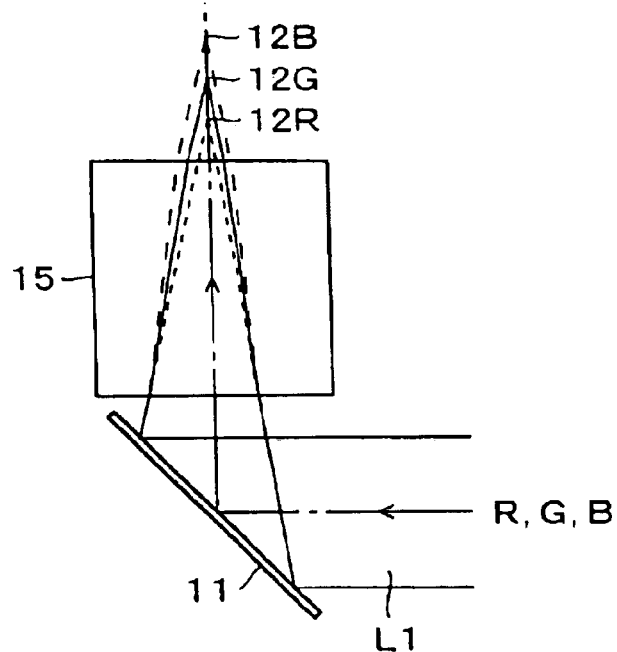
FIG. 3 is a diagram showing an optical system composed of a HOE and a prism wherein longitudinal chromatic aberration occurs.

Now, consider a case where the HOE 11 shown in FIG. 1 is used as it is in an optical system as shown in FIG. 3. In this optical system, between the color HOE 11 shown in FIG. 1 and its imaging point, there is disposed a rectangular parallelepiped prism 15 formed of optical glass. In general, optical glass exhibits dispersion, and has different refractive indices for different wavelengths. Thus, the optical path length inside the prism varies with wavelength. This causes the imaging points 12R, 12G, and 12B of the R, G, and B light beams to be dislocated from one another. This produces longitudinal chromatic aberration, and makes high-resolution imaging impossible.

The method of fabricating the color HOE 11 by the use of the optical system shown in FIG. 2 stands on the same principle as that disclosed in Japanese Patent Application Laid-Open No. H7-210066. These fabrication methods cause no problem with an optical system composed solely of a color HOE 11 as shown in FIG. 1, but cause chromatic aberration as described above with an optical system in which a transmissive optical element is disposed in the optical path.

First Embodiment

Figure 4:
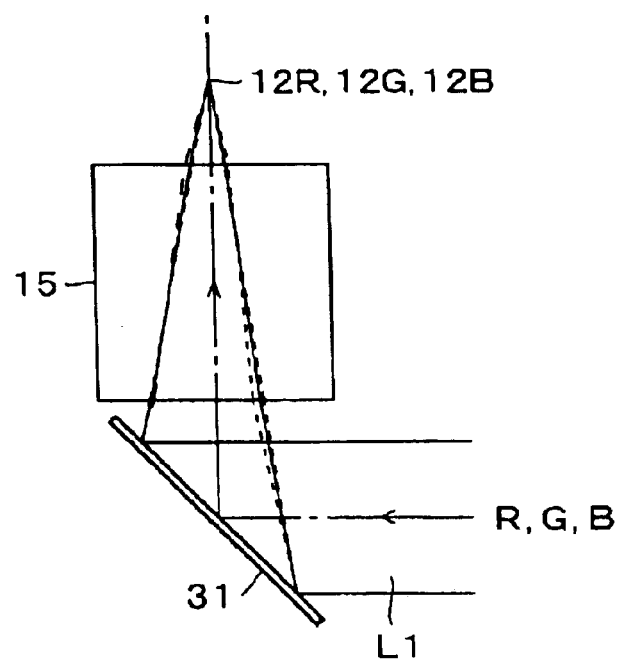
FIG. 4 is a diagram showing the optical system of a first embodiment of the invention.

FIG. 4 shows the optical system of a first embodiment of the invention. In this optical system, as in that shown in FIG. 3, a prism 15 is disposed between a color HOE 31 and its imaging point. In addition, here, the color HOE 31 corrects longitudinal chromatic aberration.

Longitudinal chromatic aberration can be corrected, for example, by shortening the distance to the imaging point 12B of B light and lengthening the distance to the imaging point 12R of R light so as to make these imaging points 12B and 12R coincident with the imaging point 12G of G light. This is achieved by shortening the focal length of the color HOE 31 for B light and lengthening the focal length thereof for R light. The color HOE 31 used here is a multicolor HOE composed of independent HOEs each designed for a different wavelength, and thus permits the focal lengths of the individual HOEs to be set independently. In this way, the color HOE 31 is made to have equal focal lengths for the R, G, and B light beams.

Figure 5:
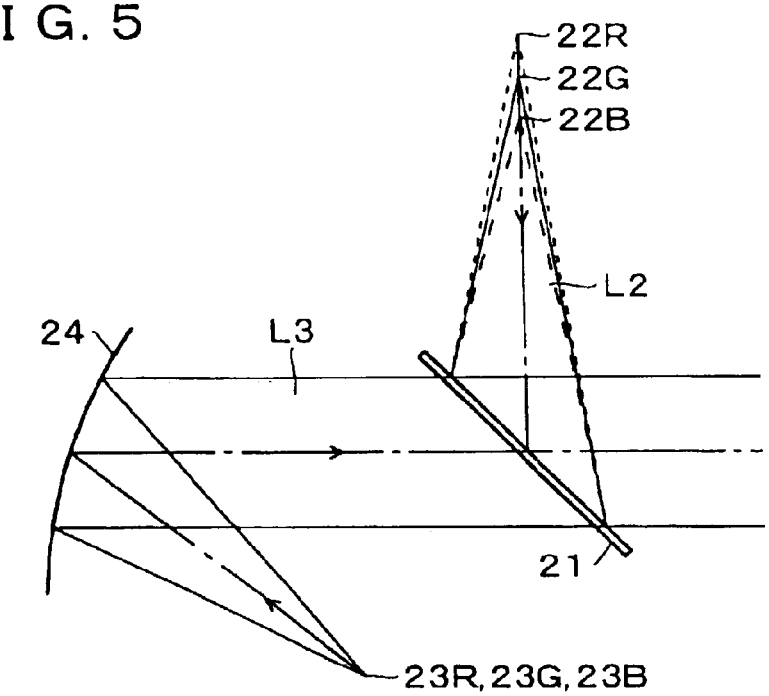
FIG. 5 is a diagram showing an optical system used to fabricate the HOE included in the optical system of the first embodiment.

FIG. 5 shows an optical system used to fabricate the color HOE 31. In the optical system shown in FIG. 2, the point light sources 22R, 22G, and 22B are made coincident with one another, and the point light sources 23R, 23G, and 23B are made coincident with one another. By contrast, in this embodiment, the point light sources 22R, 22G, and 22B at one side are dislocated from one another. Specifically, the point light source 22R of R light is located farther away from the holographic material 21 than the point light source 22G of G light is, and the point light source 22B of B light is located closer to the holographic material 21 than the point light source 22G of G light is. The light beams from the point light sources 23R, 23G, and 23B at the other side are reflected from the concave reflective surface 24 and are thereby collimated so as to be incident, as parallel light beams, on the holographic material 21. Thus, the focal length of the recorded interference fringes is equal to the distances from the point light sources 22R, 22G, and 22B to the holographic material 21. Accordingly, the focal length for R light is longer, and the focal length for B light is shorter.

Figure 6:
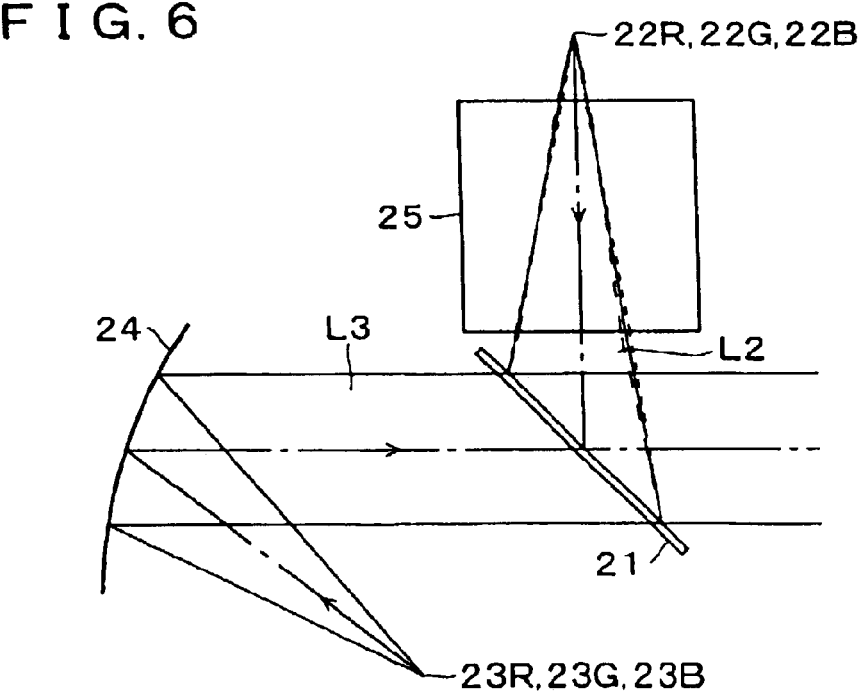
FIG. 6 is a diagram showing another optical system used to fabricate the HOE included in the optical system of the first embodiment.
Figure 7:
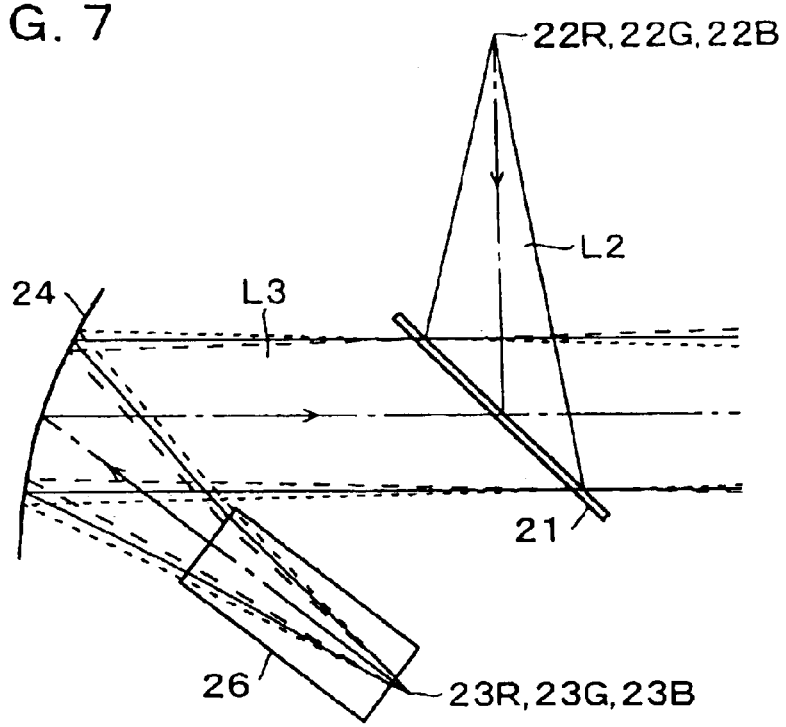
FIG. 7 is a diagram showing still another optical system used to fabricate the HOE included in the optical system of the first embodiment.

In reality, when the holographic material is exposed, a pin hole is disposed on the point light sources to spatially filter the light beams for exposure. This makes it difficult to locate the point light sources 22R, 22G, and 22B as described above. FIGS. 6 and 7 show optical systems that achieve the same effect as described above with coincident point light sources.

In the optical system shown in FIG. 6, a correction prism 25 equivalent to the prism 15 used in combination with the color HOE 31 is inserted between the point light sources 22R, 22G, and 22B and the holographic material 21. The positions of the point light sources 22R, 22G, and 22B are coincident with one another, and the arrangement from the point light sources 22R, 22G, and 22B to the holographic material 21 is the same as the arrangement at the time of use shown in FIG. 4.

The dispersion by the correction prism 25 permits the optical distances from the holographic material 21 to the point light sources 22R, 22G, and 22B to be varied, and this makes it possible to fabricate a color HOE 31 equivalent to that fabricated by the use of the optical system shown in FIG. 5.

In the optical system shown in FIG. 7, a correction prism 26 is inserted between the point light sources 23R, 23G, and 23B and the concave reflective surface 24. This makes the optical distances from the point light sources 23R, 23G, and 23B to the concave reflective surface 24 different from one another, and therefore, by adjusting the concave reflective surface 24 and the degree of dispersion effected by the correction prism 26 (i.e., the dispersion value and the optical path length), it is possible to produce the desired differences between the focal lengths of the color HOE 31 for the R, G, and B light beams. For example, the focal length of the concave reflective surface 24 is made equal to the focal length of the color HOE 31 for G light, and, as the correction prism 26, one equivalent to the prism 15 used at the time of use is used. In this way, the color HOE 31 is fabricated that corrects the longitudinal chromatic aberration produced by the prism 15. In practice, adjustments may be made in any other manner than is specifically described here.

The descriptions thus far given deal with correction of longitudinal chromatic aberration, which is color dislocation occurring along the optical axis. Next, a description will be given of correction of color dislocation that occurs perpendicularly to the optical axis. The following description concentrates on correction of color dislocation occurring perpendicularly to the optical axis, and therefore deals mainly with the central ray.

Figure 8:
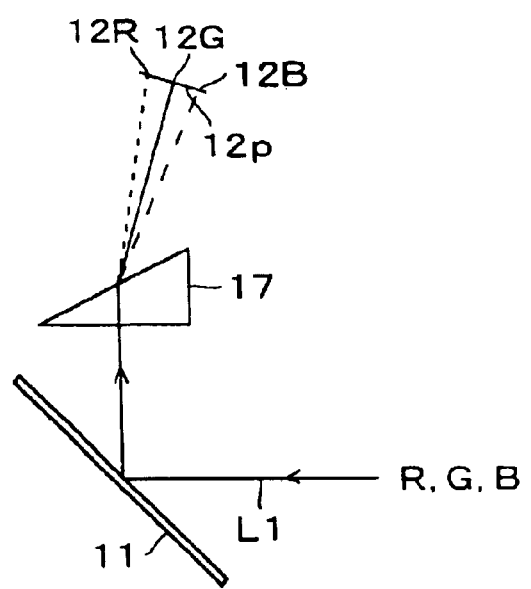
FIG. 8 is a diagram showing an optical system composed of a HOE and a prism wherein chromatic aberration occurs perpendicularly to the optical axis.

FIG. 8 shows an optical system in which the color HOE 11 fabricated by the use of the optical system shown in FIG. 2 is combined with a wedge-shaped prism 17. The prism 17 is disposed between the color HOE 111 and its imaging point. As described earlier, the color HOE 11 fabricated by the use of the optical system shown in FIG. 2 acts on the R, G, and B light beams in the same manner. Accordingly, the R, G, and B light beams incident on the color HOE 11 are diffracted in the same direction and are then incident, as identical light beams, on the prism 17. The prism 17 has a dispersion, and thus refracts the R, G, and B light beams at different angles of refraction. This causes these light beams to be imaged at different points 12R, 12G, and 12B on the imaging surface 12p. In this way, color dislocation occurs perpendicularly to the optical axis.

Second Embodiment

Figure 9:
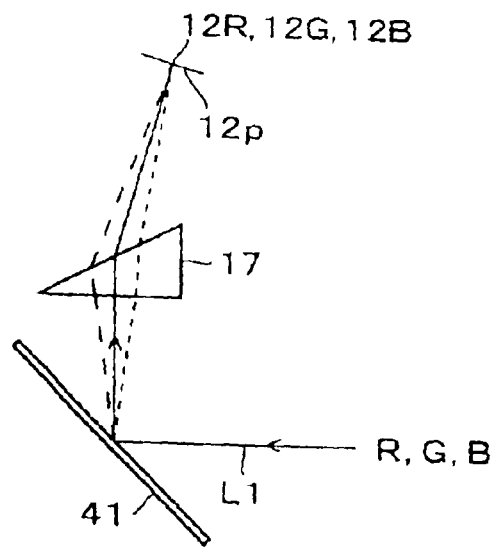
FIG. 9 is a diagram showing the optical system of a second embodiment of the invention.

FIG. 9 shows the optical system of a second embodiment of the invention. In this optical system, as in that shown in FIG. 8, a prism is disposed between the color HOE 41 and its imaging point. In addition, here, the color HOE 41 corrects chromatic aberration that occurs perpendicularly to the optical axis.

To achieve such correction, the R, G, and B light beams are made incident on the prism 17 at different angles of incidence. Specifically, the angle of diffraction (the angle relative to a normal to the HOE) of the color HOE 41 for B light is made greater than the angle of diffraction thereof for G light, and the angle of diffraction of the color HOE 41 for R light is made smaller than the angle of diffraction thereof for G light. The color HOE 41 used here is a multicolor HOE composed of independent HOEs each designed for a different wavelength, and thus permits the angles of diffraction of the individual HOEs to be set independently. In this way, the angles of diffraction of the color HOE 41 for the R, G, and B light beams are made different from one another, and thereby the R, G, and B light beams are made incident on the prism 17 at different angles of incidences so that the imaging points 12R, 12G, and 12B of all the light beams are coincident with one another.

Figure 10:
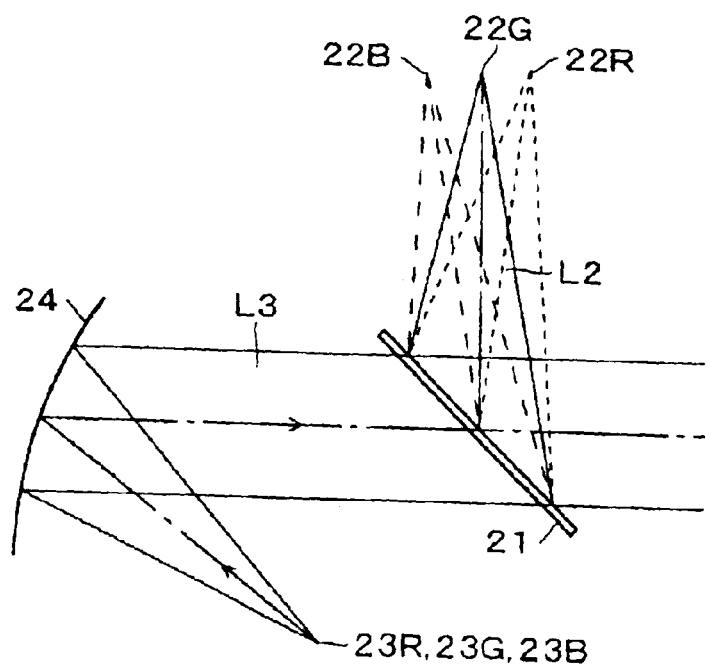
FIG. 10 is a diagram showing an optical system used to fabricate the HOE included in the optical system of the second embodiment.

FIG. 10 shows an optical system used to fabricate the color HOE 41. In the optical system shown in FIG. 2, the point light sources 22R, 22G, and 22B are made coincident with one another, and the point light sources 23R, 23G, and 23B are made coincident with one another. By contrast, in this embodiment, the point light sources 22R, 22G, and 22B at one side are dislocated from one another. Specifically, the point light source 22R of R light is so located that R light is incident on the holographic material 21 at a smaller angle of incidence than G light from the point light source 22G of G light, and the point light source 22B of B light is so located that B light is incident on the holographic material 21 at a greater angle of incidence than G light from the point light source 22G of G light.

Figure 11:
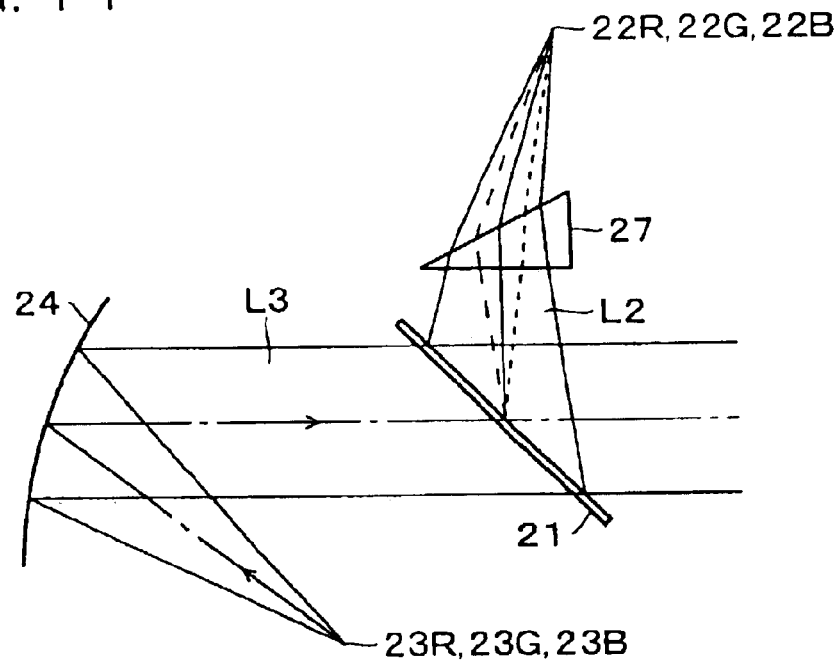
FIG. 11 is a diagram showing another optical system used to fabricate the HOE included in the optical system of the second embodiment.
Figure 12:
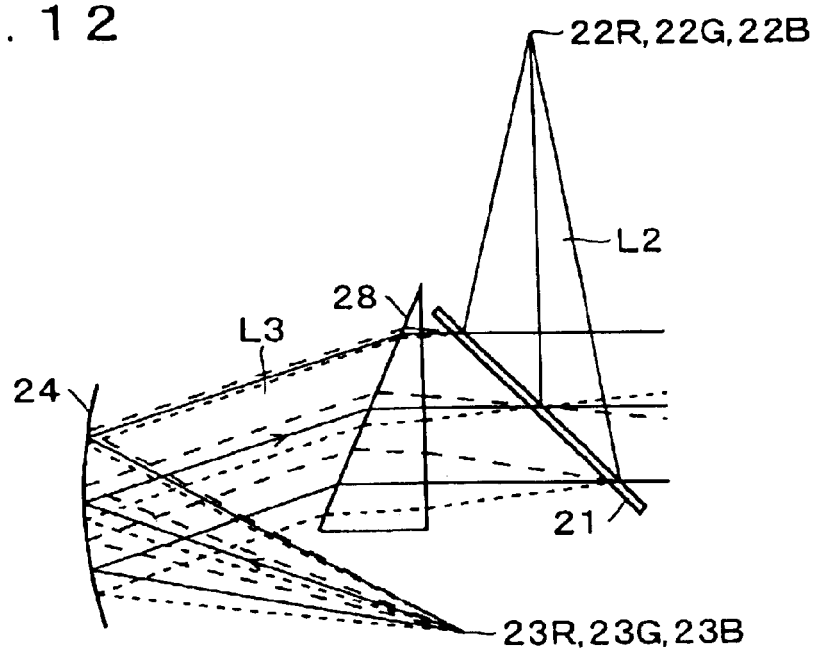
FIG. 12 is a diagram showing still another optical system used to fabricate the HOE included in the optical system of the second embodiment.
Figure 13:
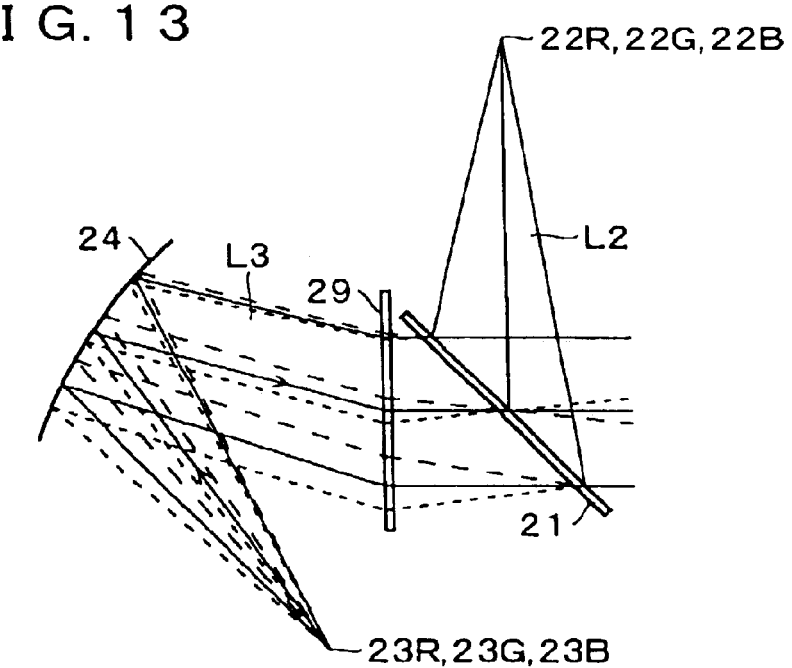
FIG. 13 is a diagram showing still another optical system used to fabricate the HOE included in the optical system of the second embodiment.

In reality, as described earlier, when the holographic material is exposed, a pin hole is disposed on the point light sources to spatially filter the light beams for exposure. This makes it difficult to locate the point light sources 22R, 22G, and 22B as described above. FIGS. 11, 12, and 13 show optical systems that achieve the same effect as described above with coincident point light sources.

In the optical system shown in FIG. 11, a correction prism 27 equivalent to the prism 17 used in combination with the color HOE 41 is inserted between the point light sources 22R, 22G, and 22B and the holographic material 21. The positions of the point light sources 22R, 22G, and 22B are coincident with one another, and the arrangement from the point light sources 22R, 22G, and 22B to the holographic material 21 is the same as the arrangement at the time of use shown in FIG. 9.

The dispersion by the correction prism 27 permits the optical positions of the point light sources 22R, 22G, and 22B relative to the holographic material 21 to be varied, and this makes it possible to fabricate a color HOE 41 equivalent to that fabricated by the use of the optical system shown in FIG. 10. Here, with respect to imaging, it is to be noted that, at the time of use, the wedge-shaped prism 17 also produces astigmatism. While the optical system shown in FIG. 10 cannot correct astigmatism, the optical system shown in FIG. 11 can correct not only chromatic aberration occurring perpendicularly to the optical axis but also astigmatism.

In the optical system shown in FIG. 12, a correction prism 28 is inserted between the concave reflective surface 24 and the holographic material 21. The R, G, and B light beams are collimated by the concave reflective surface 24 and are thereby formed into parallel light beams, which are then incident on the holographic material 21 at different angles of incidence. Thus, by adjusting the degree of dispersion effected by the correction prism 28, it is possible to produce differences between the angles of diffraction of the color HOE 41 for the R, G, and B light beams.

In the optical system shown in FIG. 13, instead of the correction prism 28 shown in FIG. 12, a correction diffractive element 29 is used. In this example, the angles of incidence of the R, G, and B light beams are made different only in the up/down direction of the figure, and therefore the correction diffractive element 29 is a one-dimensional diffractive element. In general, a diffractive element has a higher dispersion than a refractive element, and is therefore suitable to produce great differences in angle between the R, G, and B light beams. Moreover, a diffractive element has a dispersion of opposite sign to that of a refractive element, and this is why the parallel light beams L3 from the concave reflective surface 24 are deflected in opposite directions between in FIGS. 12 and 13.

Figure 14:
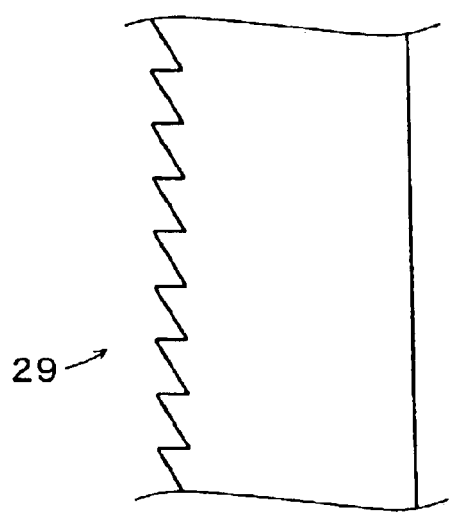
FIG. 14 is a diagram showing an example of the diffractive element used in the optical system shown in FIG. 13.

FIG. 14 shows an example of the correction diffractive element 29. In this example, to obtain high diffraction efficiency and to cause diffraction of the desired order concentrically, the correction diffractive element 29 is given a one-dimensional blazed shape. It is possible to use instead a diffractive element having a multilevel shape with eight or four levels, or a diffractive element in the shape of a binary grating. A diffractive element in the shape of a binary grating causes diffraction in two directions, i.e., causes diffraction of orders ±1. A diffractive element having a multilevel shape with a small number of levels produces light of order 0, which is not diffracted. Accordingly, when one of these diffractive elements is used, appropriate measures need to be taken to prevent unnecessary light of order 1 or 0 from being incident on the holographic material 21.

The method used in the first embodiment to correct longitudinal chromatic aberration and the method used in the second embodiment to correct chromatic aberration occurring perpendicularly to the optical axis can be used in combination. By combining these methods together, it is possible to realize a color HOE that can correct, both in the longitudinal and lateral directions, the chromatic aberration produced by another transmissive optical element at the time of use. With an optical system including a transmissive optical element and a color HOE as described above, it is possible to increase flexibility in design, and thereby achieve not only higher performance but also miniaturization and cost reduction by reducing the number of components. It is also possible to increase flexibility in the arrangement of elements.

Figure 15:
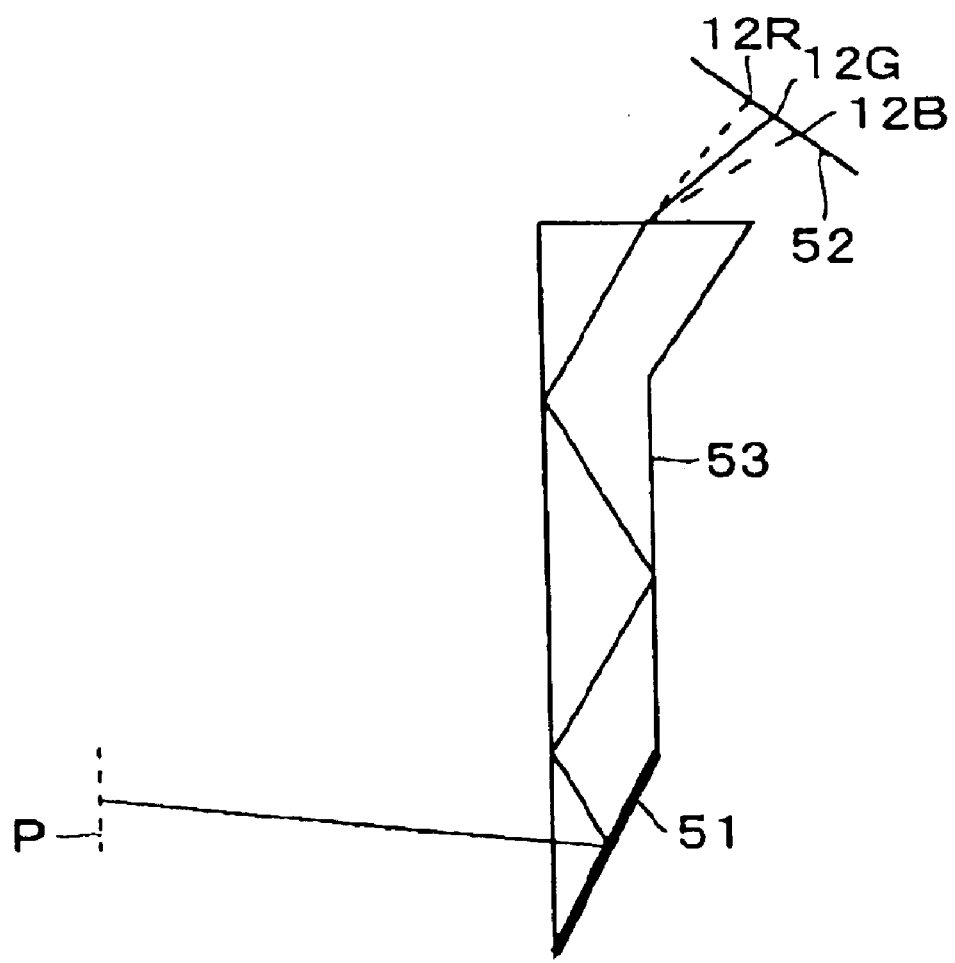
FIG. 15 is a diagram showing an optical system wherein chromatic aberration occurs perpendicularly to the optical axis.

An example of an optical system that is expected to achieve higher performance by application of the present invention thereto will be described. FIG. 15 is a sectional view showing an outline of an information display optical system employing a HOE which the applicant of the present invention proposed in United States Patent Application Published No. US 2001/0033401 A1. An image light beam from a display element surface 52 enters a prism 53, and is repeatedly total-reflected inside the prism 53 to reach a HOE 51 provided at an angle at the lower end of the prism 53. The image light beam is then reflected (diffracted) by the HOE 51 so as to exit from the prism 53 and then enter an observer's pupil P. The HOE 51 has an optical power equivalent to that of a free-form concave reflective surface, and functions also as an eyepiece lens that projects, with enlargement, the image displayed on the display element surface 52.

The optical path shown in the figure is that of the ray connecting the center of the pupil P to the center of the display element surface 52. Although, in reality, the light beam travels in the direction described above, for easy understanding, the following description traces the optical path from the pupil P. The ray diffracted by the HOE 51 advances inside the prism 53 and exits therefrom through its top-end surface. Since the ray advances by being total-reflected inside the prism 53, it is incident at an angle on the top-end surface of the prism 53.

Figure 16:
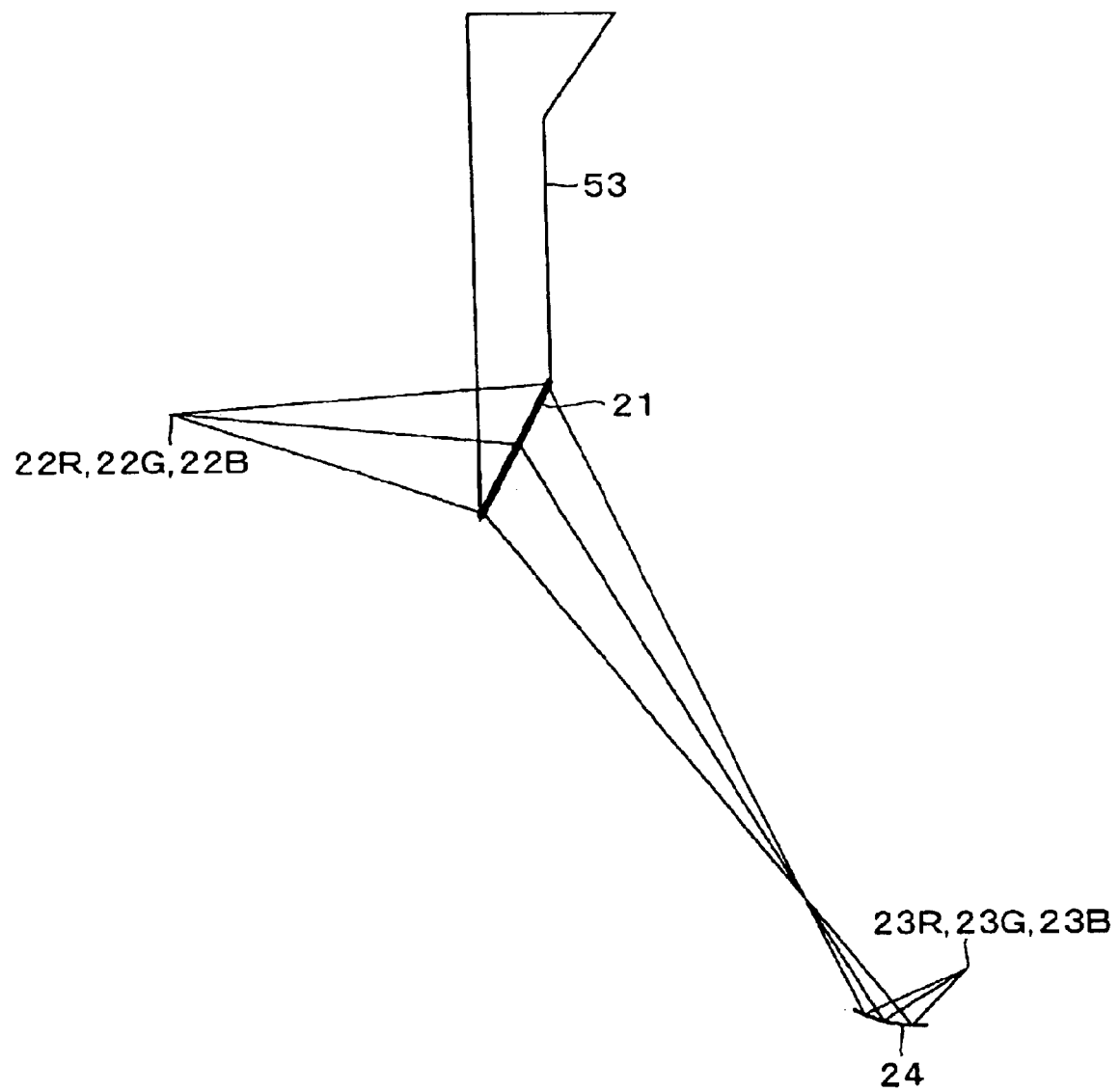
FIG. 16 is a diagram showing an optical system used to fabricate the HOE included in the optical system shown in FIG. 15.

FIG. 16 shows an optical system used to fabricate the HOE 51 used here. As described in U.S. Pat. No. 2001/0033401 A1, this display optical system is a nonaxisymmetric optical system, and therefore, to produce satisfactory images, the HOE 51 needs to perform complicated wavefront conversion. Accordingly, the concave reflective surface 24 used at the time of fabrication is given a free-form surface that produces a complicated wavefront. When only a concave reflective surface is used at the time of fabrication, the HOE 51 so fabricated acts on the R, G, and B light beams in the same manner. Thus, in the optical system shown in FIG. 15, which employs this HOE 51, as in the optical system shown in FIG. 8, the dispersion by the prism 53 causes the R, G, and B light beams to exit therefrom in different directions. Thus, these light beams are imaged at different points 12R, 12G, and 12B on the display element surface 52. Such differences in position of the imaging points 12R, 12G, and 12B are recognized as color dislocation in the actually presented images.

Third Embodiment

FIG. 17 shows an information display optical system of a third embodiment of the invention in which the problem of color dislocation mentioned above is overcome. This display optical system is provided with a color HOE 61 of which the angles of diffraction for the R, G, and B light beams are so adjusted that the imaging points 12R, 12G, and 12B at which the rays of the R, G, and B light beams emanating from the same point on the pupil P are imaged are coincident with one another.

FIG. 18 shows an optical system used to fabricate this HOE 61. Here, unlike in the optical system shown in FIG.

16, a correction prism 28 is disposed between the point light sources 23R, 23G, and 23B and the holographic material 21. The light beams from the point light sources 23R, 23G, and 23B are reflected from the free-form concave reflective surface 24, and are then reflected from a flat reflective surface 24a so as to enter the correction prism 28.

The light beams are incident at an angle on the surface of the correction prism 28, and the dispersion by the correction prism 28 refracts the R, G, and B light beams in different directions and thereby causes them to be incident on the holographic material 21 at different angles. Accordingly, the HOE 61 produced from the holographic material 21 has different angles of diffraction for the R, G, and B light beams. The differences in the degree to which the correction prism 28 diffracts the R, G, and B light beams are so adjusted that the color HOE 61 makes the imaging points 12R, 12G, and 12B of the R, G, and B light beams on the display element surface 52 coincident with one another.

The description above traces the optical path from the color HOE 61 to the display element surface 52. However, in reality, the light beams travel from the display element surface 52 to the color HOE 61, and thus the color HOE 61 corrects the chromatic aberration produced by the prism 53. In this embodiment, only chromatic aberration occurring perpendicularly to the optical axis is corrected. It is possible, however, to correct longitudinal chromatic aberration simultaneously as described earlier. This makes it possible to produce images with still higher quality.

Obviously, many modifications and variations of the present invention are possible in light of the above teachings. It is therefore to be understood that within the scope of the appended claims, the invention may be practiced other than as specifically described.

What is claimed is:

1. An information display optical system comprising:

a display element that displays an image formed by light of different wavelength bands;

a prism that transmits an image light incident thereon from the display element; and a holographic optical element including a plurality of holograms that have diffraction efficiency in the different wavelength bands so as to be capable of reproducing different wavefronts in the different wavelength bands, the holographic optical element having an optical power equivalent to an optical power of a concave free-form reflective surface so as to function as an eyepiece lens by directing the image light from the display element to an observer's eye, wherein aberration resulting from a fact that the light transmitted through the prism includes light of the different wavelength bands is corrected by the holographic optical element reproducing the different wavefronts in the different wavelength bands and wherein the corrected aberration is longitudinal chromatic aberration that occurs along an optical axis of the optical system.

2. An optical system as claimed in claim 1, wherein the holographic optical element also corrects a chromatic aberration that occurs perpendicularly to the optical axis of the optical system.

3. An optical system as claimed in claim 1, wherein the holograms included in the holographic optical element are reflective holograms.

4. A method for fabricating a holographic optical element to correct a chromatic aberration having diffraction efficiency in a plurality of wavelength bands, comprising:

a plurality of steps of irradiating a holographic material with two light beams so as to record interference fringes produced between the two light beams on the holographic material, the plurality of steps being performed successively or simultaneously, wherein, from one step to a next, wavelengths of the light beams with which the holographic material is irradiated are changed and a wavefront of at least one of the light beams is changed by a transmissive optical element that transmits light or by a diffractive optical element that diffracts light relative to at least one other light beam to correct the chromatic aberration, the at least one other light beam having a different wavelength than the at least one of the light beams, and wherein dispersion by the transmissive optical element or the diffractive optical element permits optical positions of the light beam sources relative to the holographic material to be varied.

5. A method for fabricating a holographic optical element as claimed in claim 4, wherein the corrected chromatic aberration is a chromatic aberration occurring perpendicular to the optical axis.

6. A method for fabricating a holographic optical element as claimed in claim 4, wherein the corrected chromatic aberration is a longitudinal chromatic aberration.

7. A method for fabricating a holographic optical element as claimed in claim 4, wherein the holographic element so fabricated is a reflective hologram.

8. A method for fabricating a holographic optical element as claimed in claim 4, wherein the holographic element so fabricated is a volume-type, phase-type hologram that does not substantially absorb light.

9. A method for fabricating a holographic optical element as claimed in claim 4, wherein the transmissive optical element that transmits light is a prism.

10. An optical system as claimed in claim 1, wherein the holograms included in the holographic optical element are volume-type, phase-type holograms that do not substantially absorb light.

* * * * *